(12) United States Patent
Zahavi et al.

(10) Patent No.: US 9,602,613 B2
(45) Date of Patent: Mar. 21, 2017

(54) METHOD AND SYSTEM FOR ACCELERATING BROWSING SESSIONS

(75) Inventors: Yoram Zahavi, Zichron-Ya'acov (IL); Moran Cohen, Jerusalem (IL)

(73) Assignee: FLASH NETWORKS, LTD, Herzliya (IL)

( * ) Notice: Subject to any disclaimer, the term of this patent is extended or adjusted under 35 U.S.C. 154(b) by 1422 days.

(21) Appl. No.: 12/239,657

(22) Filed: Sep. 26, 2008

(65) Prior Publication Data

US 2009/0094377 A1    Apr. 9, 2009

Related U.S. Application Data

(60) Provisional application No. 60/977,380, filed on Oct. 4, 2007.

(51) Int. Cl.
    *G06F 15/16* (2006.01)
    *H04L 29/08* (2006.01)
    *G06F 17/30* (2006.01)

(52) U.S. Cl.
    CPC .... *H04L 67/2804* (2013.01); *G06F 17/30905* (2013.01); *H04L 67/34* (2013.01)

(58) Field of Classification Search
    CPC ............................ H04L 67/2804; H04L 67/34
    USPC .......................... 709/201, 202, 203, 232, 238
    See application file for complete search history.

(56) References Cited

U.S. PATENT DOCUMENTS

| | | | |
|---|---|---|---|
| 5,946,697 A | 8/1999 | Shen | |
| 6,085,229 A * | 7/2000 | Newman | G06F 17/30867 707/E17.109 |
| 6,249,844 B1 | 6/2001 | Schloss et al. | |
| 6,640,284 B1 | 10/2003 | Shaw et al. | |
| 6,654,766 B1 | 11/2003 | Degenaro et al. | |
| 6,822,663 B2 * | 11/2004 | Wang | G06F 17/30914 707/E17.121 |
| 7,047,281 B1 * | 5/2006 | Kausik | G06F 17/30905 707/E17.121 |
| 7,234,107 B1 * | 6/2007 | Aoki | G06F 17/2247 707/E17.121 |

(Continued)

FOREIGN PATENT DOCUMENTS

| | | |
|---|---|---|
| WO | WO 01/20485 A2 | 3/2001 |
| WO | WO0120485 A2 | 3/2001 |

(Continued)

*Primary Examiner* — Dhairya A Patel

(74) *Attorney, Agent, or Firm* — Smith Tempel Blaha LLC; Gregory Scott Smith

(57) ABSTRACT

A solution that improves a user's experience while surfing the Internet. An intermediate device resides logically between a browsing device and content available via the Internet. As responses to content requests from browsing devices are received from a content server, browser links are identified and modified, disabled or covered for example. The intermediate device also creates a browser link to a compound browser object(s) that is created and stored at the intermediate device. This created browser link invokes code at the intermediate device to upload the compound browser object(s). The intermediate device obtains these compound browser objects by obtaining content associated with the identified browser links either from a content server, a local cache or knowledge of its existence eat the browser device.

20 Claims, 5 Drawing Sheets

(56) References Cited

U.S. PATENT DOCUMENTS

| | | | |
|---|---|---|---|
| 7,761,500 B1* | 7/2010 | Eckert | H04L 67/2814 709/203 |
| 7,769,145 B2* | 8/2010 | Melideo | H04L 12/66 379/219 |
| 7,779,103 B1* | 8/2010 | Fikes | G06F 21/6263 709/219 |
| 2001/0044809 A1* | 11/2001 | Parasnis | G06F 9/4448 715/201 |
| 2002/0147772 A1* | 10/2002 | Glommen | G06Q 30/02 709/203 |
| 2002/0147912 A1 | 10/2002 | Shmueli et al. | |
| 2003/0188021 A1 | 10/2003 | Challenger | |
| 2003/0191812 A1 | 10/2003 | Agarwalla et al. | |
| 2004/0177152 A1* | 9/2004 | Aviran | G06F 17/30902 709/235 |
| 2004/0243704 A1 | 12/2004 | Botelho et al. | |
| 2005/0021862 A1* | 1/2005 | Schroeder | G06Q 30/02 709/246 |
| 2006/0224700 A1 | 10/2006 | Chory | |
| 2006/0271642 A1* | 11/2006 | Stavrakos | G06F 17/30902 709/217 |
| 2007/0185971 A1 | 8/2007 | Idan | |
| 2007/0198716 A1 | 8/2007 | Knowles | |
| 2007/0233898 A1 | 10/2007 | Raviv | |
| 2008/0072136 A1 | 3/2008 | Lotenberg | |
| 2008/0172488 A1* | 7/2008 | Jawahar | G06F 17/30902 709/225 |
| 2008/0249798 A1* | 10/2008 | Tulshibagwale | G06Q 30/02 705/1.1 |
| 2008/0250103 A1* | 10/2008 | Bar-Yaacov | G06F 17/30902 709/203 |

FOREIGN PATENT DOCUMENTS

| | | |
|---|---|---|
| WO | WO 02/05126 A2 | 1/2002 |
| WO | WO 2006/127750 A1 | 11/2006 |
| WO | WO2007008291 A1 | 1/2007 |
| WO | WO2007009255 A1 | 1/2007 |

* cited by examiner

METHOD AND SYSTEM FOR ACCELERATING BROWSING SESSIONS

CROSS-REFERENCE TO RELATED APPLICATIONS

This application is a United States Non-provisional patent being filed under 35 USC 111(a) and in accordance with 37 CFR 53(b), and claims the benefit of the filing date of U.S. Provisional Application for Patent which was filed on Oct. 4, 2007 and assigned Ser. No. 60/977,380. Such application is hereby incorporated by reference in its entirety. This application is related to the content described in U.S. application patent Ser. No. 11/686,495, filed on Mar. 15, 2007 and published on Oct. 2, 2007 under the publication number 20070233898, and Ser. No. 11/462,355 filed on Aug. 3, 2006 and published on Aug. 9, 2007 under the publication number 20070185971, both of which are hereby incorporated by reference in their entirety. The RFC number 822 and/or RFC number 2557 are related to the content of this document, each of which can be retrieved from IETF (Internet Engineering Task Force) site www.IETF.org and which are hereby incorporated by reference.

BACKGROUND

The present invention relates to the field of data communications and, more particularly, to a system and method for accelerating data communication associated with or as a result of the action of browsing web pages or otherwise accessing content through the world wide web, Internet or other global or local network.

The Internet is an exceedingly popular medium for data communication between computers. The Internet is a hierarchy of many computer networks, all of which are interconnected by various types of server computers. Some of the server computers interconnected through the Internet also provide database housing or storage of a plurality of web pages or web content. These web pages may be retrieved by users, also referred to as surfers, operating computers that are connected to the Internet and running browser applications or other similar applications that request, receive and render markup language content or other Internet accessible content. Popular browser applications that are available on the market include, but are not limited to, Openwave Systems Inc. or Opera Mobile Browser (a trademark of Opera Software ASA), Microsoft Internet Explorer (a trademark of Microsoft), Firefox Web Browser, etc.

Many current web pages are defined by markup language (ML) files, including but not limited to HTML, XML, WML, SGML, HDML etc. HTML is an acronym for Hyper Text Markup Language, XML is an acronym for Extensible Markup Language and WML is an acronym for Wireless Markup Language. SGML is an acronym for Standardized General Markup Language. HDML is an acronym for Handheld Device Markup Language. It should be noted that the terms "HTML", "XML", "SGML", "HDML" and "WML" may be used interchangeably herein. Henceforth, the description of different embodiments of the present invention may use the terms 'ML' and/or 'HTML' as a representative term for any of the various forms of markup languages unless specifically limited to a particular markup language.

A ML file contains various commands, instructions, data and references (links) that together, define the overall appearance of a web page. Once the ML file is fetched and rendered using a browser or other similar application, the intended web page can be displayed on a display device.

Common HTML files may comprise information that is relevant to the web page and is needed for rendering the requested web page. This information may include, but is not limited or required to include, a style sheet, text, images, Java Scripts, links to a style sheet, links to Java Scripts, links to additional objects, links to other web pages, etc. A web page can be composed from a plurality of objects or segments of the web page that together comprises the web page. The objects or various parts of a web page can be distributed over a plurality of servers.

Often times, an HTML file comprises links to the above-described objects rather than the objects themselves. This technique is widely utilized, thus most HTML files can include basic text and links to style sheets, JavaScripts, images, and other objects and not the style sheet or the object itself, etc. Objects that are used by the browser itself are referred as browser's objects. The links to the browser's objects are fetched automatically by the browser application during parsing of the page—these links are referred to as browser links. Links like, but not limited to, links to Java scripts, style sheets, and images can be referred as browser links. Other links are displayed as a portion of the rendered page and may appear as highlighted, underlined, colored or otherwise differentiated text or graphic elements. These links are available to be selected by the surfer, and as such, are referred as surfer links or user links. As an example, a surfer link, when selected may result in navigating to another web page.

While surfing the World Wide Web (WWW), a surfer (a user), utilizing a browser equipped computer or endpoint device, may send an HTTP (Hyper Text Transfer Protocol) request to a web server. In response, the web server may send an HTML file that defines the requested web page. In the disclosure of different embodiments of the present invention, the term computer or endpoint represents any type of data communication device including, but not limited to, a laptop computer, a PDA, a cellular unit, a notebook computer, a personal computer, etc. Upon receiving the HTML file, the browser begins parsing the HTML file. When a browser link is found, the browser may stop or pause the parsing process and search its cache for an object that was previously fetched from the same link. If such object does not exist, then the browser establishes a new connection according to the browser link or uses an existing connection, waits to get the object, parses the object and accordingly, may continue parsing the HTML file. In the below description, the term transaction is used for sending a request for an object and getting a response to the request. In some cases, for example, when the browser links define a style sheet, then presenting of the text can be delayed until receiving the style sheet. Fetching the browser links during the rendering of the web page increases the time needed for presenting the web page, and has an impact on the experience of the surfer.

Furthermore, fetching the objects by the browser increases the load on the Internet and increases the time for fetching the page due to the overhead of setting new transactions to the plurality of servers at which the objects are stored, as well as the time that it takes to send the request and get the response. This problem is exacerbated when the connection of the surfer's computer is provided over a narrow bandwidth link, such as a cellular link, or when the web-servers are overloaded.

There are some techniques set forth to reduce the impact resulting from fetching of a plurality of objects. Some of the methods convert an HTML file into another file format, such as a bitmap, for example, to be transmitted to a surfer.

Another prior art method, which is disclosed in U.S. patent application Ser. No. 11/576,820 uses an intermediate device operating between a surfer who requested a web page and a content server that delivers the web page. The intermediate device intercepts a markup language file that received from the content server and that is directed to a requesting client device. The ML file is parsed by the intermediate device to determine if at least one browser link is identified. If a browser link is identified, the browser object that is associated with the identified browser link is fetched and placed into the ML file instead of the browser link to create a modified markup language file that includes the objects instead of the browser links. The modified markup language file is transferred to the requesting client device. This method can reduce the amount of time that is required to transmit the content to the client device and thus, improves the user experience.

Other techniques aimed at improving the performance of the browser, may use an intermediate device for fetching the browser objects, aggregating the fetched data, combining the browser objects into one or more compound objects, such as multipart object, and transmitting the compound objects to the browser. An exemplary compound object can be a multipart object, XML file, an archive object such as a zip file, etc. The term multipart object and compound object can be used interchangeably and the term multipart can be used as representative name for any of the above group of compound objects. Because the intermediate device fetches the additional files within the HTML file, the client device does not have to make additional data requests to retrieve these additional files. Exemplary prior art methods that implement compound objects are disclosed in U.S. patent application Ser. Nos. 11/686,495, 11/462,355 the contents of which are incorporated herein by reference. Other methods have been published in PCT international publications such as: WO 2007/009255, WO 2007/008291 or in US publications: US 2006/0,271,642 and US 2006/0,224,700.

Although the above-described techniques do provide some level of improvement the user's experience in surfing the web, they have some limitations and fall short of what is needed in the art. For example, some old methods eliminate the benefit of using a common web page. For example, a user cannot copy a section of the converted web page and use it in his document. Other techniques are not aware of the content of the cache in the user's device or may just estimate its content. Such techniques may send browser objects that already exist in the browser's cache. Some of the techniques may require a modification in the user's devices to include a module that can communicate with the intermediate device. The module can inform the intermediate device about the content of the browser's cache, for example. Some of the methods need an additional connection and a unique protocol in order to report the content of the cache.

Therefore there is a need in the art for a system and a method for reducing the number of requests a browser sends during the process of rendering a web page. Furthermore, there is a need for a system that is aware of the content of a requester's device cache and can operate to send only objects that are not in the cache or that have been changed. In addition, there is a need that such a system does not enforce a modification to the user or client devices. Due to the huge number of users, each modification can involve drastic technical and marketing problems. Such a system may reduce the download time of a web page, improve the time to text (which is defined as the time to download and display a requested web page) of the page and reduces the load over the net.

BRIEF SUMMARY

Different embodiments of the present invention solve the above-described needs by providing a system and method for improving a user's experience while surfing the Internet. An exemplary system can be installed at an intermediate device between a surfer and the Internet, such as a surfing acceleration server (SAS). Such an intermediate device can be at a service provider premises (SPP). The service provider can be a telecom carrier, such as but not limited to, a cellular service provider, a satellite communication service provider, a Public Switched Telephone Network (PSTN) carrier, an access network service provider, etc. Other exemplary embodiments of the present invention can be installed in an Internet Service Provider (ISP) premises, for example. Other exemplary embodiments of the present invention can be installed at content provider premises.

Thus, embodiments of the present invention can provide a solution that improves a user's experience while surfing the Internet. An intermediate device resides logically between a browsing device and content available via the Internet. As responses to content requests from browsing devices are received from a content server, browser links are identified and modified, disabled, covered, or converted to a link to a compound object that includes the relevant browser object, for example. The cover prevents the requesting browser from identifying the original link and requesting the covered (the original) browser objects. The intermediate device also creates a browser link to a browser object(s) that is (are) created and stored at the intermediate device. The retrieval of these created browser links, results with invoking of a code at the browser. An exemplary code when executed manipulates the ML file in order to enable the retrieval of the browser object(s). The intermediate device obtains these browser objects by obtaining content associated with the identified browser links either from a content server, a local cache or knowledge of its existence at the browser device.

An exemplary embodiment of the present invention can operate to (a) intercept the data traffic between a plurality of users and the Internet; (b) parse the traffic; and (c) transfer the requests for web pages that are sent to the Internet and the responses to those requests with or without modifications. In order to accelerate the surfing process, an exemplary SAS can be adapted to deliver one or more compound objects. Each compound object includes a plurality of browser objects that are not included in a cache of a user device. A link to an exemplary compound object can include information on the links of its embedded browser objects. Information on the cache of the user device can be received by using cookie mechanism, for example.

A response to a request for a web page, which complies with an ML protocol, can be parsed and an ML-List with the browser links that are embedded within the ML file can be created. The ML file is then modified in that each browser link from the ML-List is covered, or hidden or disabled, preventing the browser from requesting the covered object. One or more browser links can be added requesting a software code which is embedded within a compound object. Additionally, or alternatively, other browser links can be added to the modified ML file for requesting software codes to be executed by the browser which are not embedded within the compound object. An exemplary code can be a JavaScript.

Furthermore, the name of the location of the additional browser object (the compound object) contains information relevant to the location of the browser objects, which are embedded within the compound object. The location can be expressed in the form of a URL. A URL is an abbreviation of Uniform Resource Locator, the global address of documents and other resources on the World Wide Web. In such example, the URL of the compound object includes information relevant to the URLs of the objects included in the compound object. At the end of the process, the modified ML file is transferred toward the requesting user device. In some embodiments of the present invention, a hash value can represent the URL of each one of the browser objects that are included in the compound object.

A cache at the intermediate device is searched for the browser objects that are listed in the ML-List. Each object, which is not valid or that is not in the cache of the intermediate device, is retrieved based on its URL and can be stored in the cache of the intermediate device.

An exemplary intermediate device can utilize an Intermediate Device Cache Table (IDCT). Each entry in the IDCT can be associated with an object that is requested and/or stored in the cache of the intermediate device. Fields in each entry can be assigned to the URL of the object; its representing hash value; an expiration date; location in the cache, an indication whether it was requested by the intermediate device after parsing an ML file or is requested by a user, etc.

A request that is received from a user is parsed. If the request is for an additional browser object requesting a compound object, then, the URL of the compound object is parsed and a request-list of browser objects is created based on the representation of the names of the browser objects and the information written in the IDCT. Objects from the request-list are fetched from the cache of the intermediate device and are combined into a compound object. A software code is added to the compound object on top of the combined browser objects. An exemplary software code can be adapted to instruct the browser to search for the covered objects; remove the cover of each found covered object, which is within the created compound object; and modify the URL of the found object to point at the compound object and the location of the found object in the compound object. An additional JavaScript can be added at the bottom of the compound object. The additional JavaScript can be executed by the browser at the end of parsing the modified ML-file. The JavaScript can instruct the browser to scan the ML-file from the beginning looking for left behind covered browser links and remove those covers. At this point of time the compound object is ready to be sent to the browser. In an alternate exemplary embodiment of the present invention, the JavaScript that handles the left behind covered browser links can be a common object and not be embedded within a multipart object.

A cookie can be assigned to the response carrying the compound object. The cookie can report the URL of the compound object, which represents the browser objects that are combined in the compound object. In a subsequent surfing for the same site, the cookie will inform the intermediate device that the compound object is stored at the cache of the requesting browser, as well as additional information, such as but not limited to, expiration date of the stored compound object. The information in the cookie can be used later by the intermediate device while modifying a subsequent ML file.

In some situations, a request for a web page is associated with a cookie that includes a URL of one or more previously received compound objects representing the browser objects that are already stored at the browser's cache. In such situations, the cookie is stored in a user's cookie table (UCT) to be used in the process of modifying the requested ML file, which represents the requested web page. The received ML file is parsed and an ML-list of browser objects is created. The ML-list is compared with the list of browser objects that are reported in the cookie. One or more additional compound objects may be created. The additional compound objects representing objects from the ML-list, which are not mentioned in the cookies.

In an exemplary embodiment of the present invention a cookie, that was already assigned to the user and now is being reported in the request for a web-page, can be updated at a later time. The cookie will be updated when responding to a request for the new compound object is received. The updated cookie will represent the compound objects that are already located at the browser's cache and the new requested compound object.

Yet in an alternate embodiment of the present invention the cookie can be updated at the browser. In such embodiment, an additional JavaScript can be added to each compound object. This additional JavaScript can cause the browser to update the cookie to include the hash values of the objects that composed the relevant compound object. In addition, a "Set Cookie" command can be added to the end of the ML.

One or more additional browser links to software codes that are included in compound objects that exist in the user's cache can be added to the modified ML file. Such an exemplary software code can be adapted to instruct the browser to search for the covered objects that are embedded at its compound object; remove the cover of each found object; and modify the URL of the found object to point at the relevant compound object and its location within this compound object. Finally, a link to a final JavaScript that is adapted to remove left behind covers is added at the end of the modified ML-file. In one exemplary embodiment, the link for the final JavaScript can point to a common object. Alternatively, the link can point at a compound object that includes the final software code. In an alternate embodiment of the present invention, the final-software-code itself can be embedded at the end of the modified ML file instead of its link. At this point the modified ML-file is ready to be sent to the browser.

The following non-limiting examples show how various embodiments of the present invention handle additional types of traffic or cases. A request, from a user, for an ML file and its associated cookies if they exist, is marked in the UCT and is transferred toward the content server. A request for an object is marked in the IDCT and is transferred toward the content server. A response from a content server that includes an object which is not an ML file (gif.; tiff., txt. css.; for example.) is stored in the cache of the intermediates device and the relevant entry in the IDCT is updated and the object is sent toward its destination. A request for a software code that is embedded within a previously sent compound object (the requested compound object is listed in the relevant entry in the UCT and therefore it was expected to be stored at the client cache), can be responded by sending a compound object that includes a idle software code, or one that does not perform any actions. The UCT is updated and the relevant compound object is removed. The updated cookie is transferred to the client with the response.

A compound object can include one or more objects of independent data types. An exemplary compound object can be a multipart object, an archive object such as a zip file, an XML file, etc. A multipart object is a data object that consists of multiple objects of independent data types, such as but not limited to: images (jpeg files, gif files), JavaScript, Cascading Style Sheet Language files (CSS), etc. The multipart object enables sending multiple objects to the browser within a response to a single request. The multipart object eliminates the need to establish a plurality of transactions to fetch the plurality of browser objects and accelerates the presentation of a web page. An exemplary multipart object can comply with Microsoft mhtml scheme. More information on multipart objects can be found in RFC number 822 and/or RFC number 2557, each of which can be retrieved from IETF (Internet Engineering Task Force) site www.I-ETF.org. The content of these RFCs is incorporated herein by reference.

An exemplary embodiment of the present invention may have a timer process that may search the IDCT looking for entries for which their expiration time has expired. When such an entry is found, the relevant one or more locations in the cache can be deleted, as well as the relevant one or more entries in the IDCT.

Other objects, features, and advantages of the present invention will become apparent upon reading the following detailed description of the embodiments with the accompanying drawings and appended claims.

DETAILED DESCRIPTION OF EMBODIMENTS OF THE INVENTION

Turning now to the figures in which like numerals represent like elements throughout the several views, exemplary embodiments of the present invention are described. For convenience, only some elements of the same group may be labeled with numerals. The purpose of the drawings is to describe exemplary embodiments and not for production. Therefore features shown in the figures are chosen for convenience and clarity of presentation only.

Figure 1:
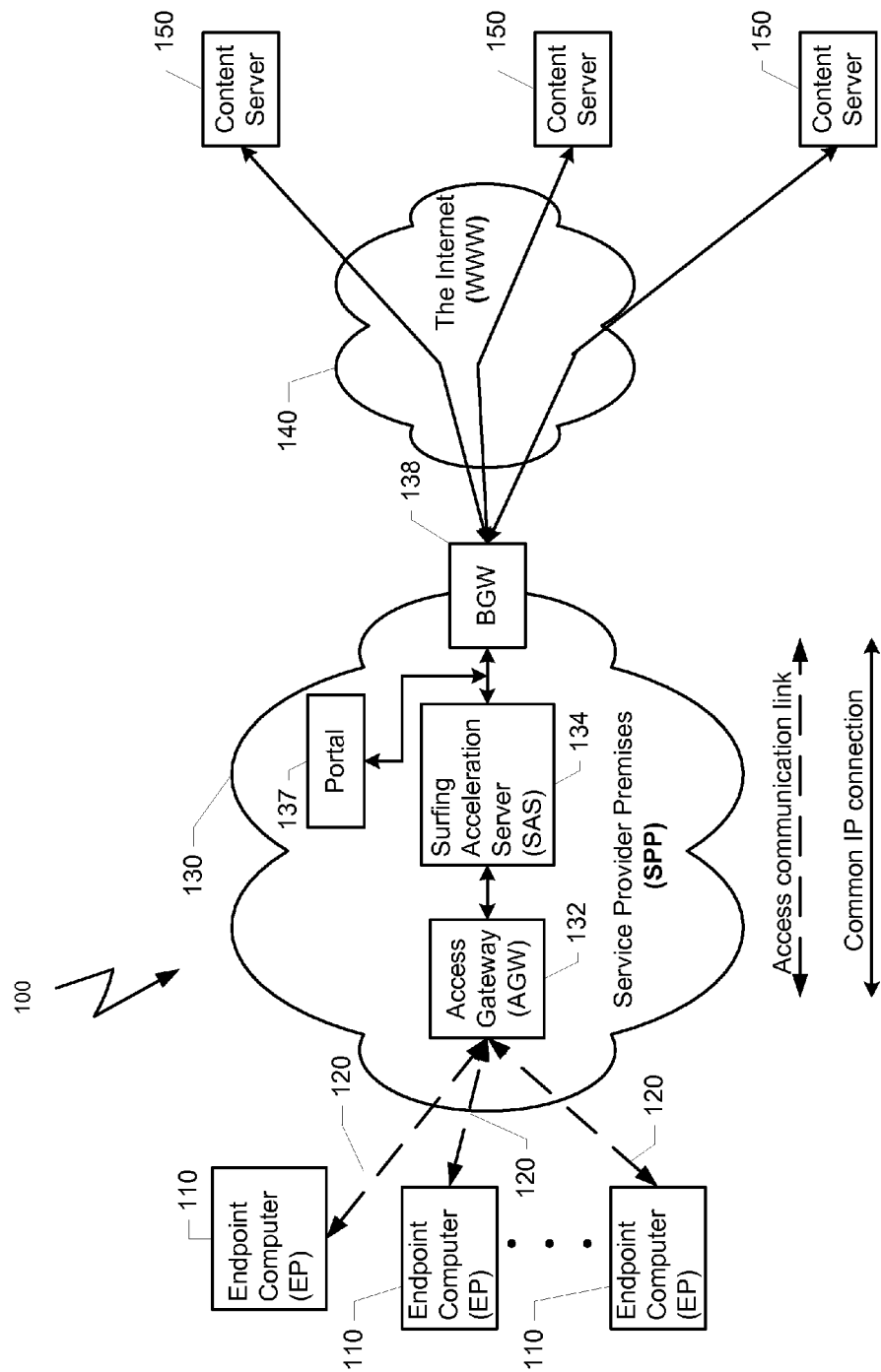
FIG. 1 illustrates a block diagram with relevant elements of an exemplary communication system that implements an exemplary embodiment of the present invention.

FIG. 1 depicts a block diagram with relevant elements of an exemplary communication system 100 that implements an exemplary embodiment of the present invention. A communication system 100 has been selected as an exemplary environment that is suitable for implementing exemplary techniques of the present invention. The communications system 100 may be a cellular data communication network, satellite networks, access networks, Internet Service Provider (ISP), or other type of network or communication system. Within the context of this description, the terms cellular, satellites, wireless, and ISP may be used interchangeably and at times, may have the same meaning.

System 100 may comprise a plurality of endpoint computers 110; a service provider premises (SPP) 130, a network 140 such as but not limited to the Internet, which can be referred also as the world wide web (WWW); and one or more Content Servers 150. An exemplary SPP 130, among other elements, may comprise an access gateway (AGW) 132, a Surfing Acceleration Server (SAS) 134 and a border gateway (BGW) 138. Furthermore SPP 130 may comprise a portal 137 of the service provider. In the context of the description the portal 137 behaves as a content server 150.

It will be appreciated by those skilled in the art that, depending upon its configuration and the needs, system 100 may comprise more than three of Content Servers 150 and endpoint computers 110. However, for purposes of simplicity of understanding, three units of each are shown. It should be noted that the terms "content server" and "web server" may be used interchangeably herein. Henceforth, the description of embodiments of the present invention may use the term 'server' as a representative term for a content server, a web server, or any other type of server that may be surfed by a user. It should be noted that the terms "endpoint computer", "endpoint", "client", "surfer", "user's device", "client device" and "user" may be used interchangeably herein.

System 100 is based on the Internet Protocol (IP). It may represent one or more networks segments, including but not limited to one or more Internet segments, one or more Intranets, etc. System 100 may run over one or more types of physical networks, such as but not limited to, the Public Switched Telephone Network (PSTN), an Integrated Services Digital Network (ISDN), a cellular network, a satellite network, etc. It may also run over a combination of two or more of these networks. System 100 may include intermediate nodes along the connection between a client and a content server. The intermediate nodes may include, but not limited to: IP service provider servers, cellular service provider servers and other type of service providers' equipments.

A plurality of endpoint computers 110 may be served by the System 100 and able to access the content servers 150 via the SPP 130 and the Internet 140. A common endpoint computer 110 may run a browser software application in order to surf the network and to communicate with one or more content servers 150. An exemplary browser application can be the INTERNET EXPLORER (a trademark of Microsoft), for example. Exemplary endpoint computers 110 can be a personal computer (PC), a notebook computer, a cellular telephone or handset, a handheld computer, a personal data assistant (PDA), or any other computing device with wire or wireless communication capabilities, etc.

The plurality of endpoint computers 110 are connected via data links 120 to the Access Gateway (AGW) 132 within the SPP 130. The connection between the endpoint computers 110 and the SPP 130 may be via intermediate nodes (such as a base station etc.) not shown in FIG. 1. The AGW 132 acts as an access gateway between the network protocol that is used over communication links 120 and IP network that is used over the SPP 130. Exemplary AGW 132 may be a Remote Access Server (RAS), Gateway GPRS Support Node (GGSN), Packet Data Serving Node (PDSN), CDMA2000 Radio Access Network (RAN) or any other similar node.

Border Gateway (BGW) 138 is the interface between the Internet 140 and the SPP 130. BGW 130 may route the upload communication toward the appropriate destination over network 140. In case that the upload transportation is a request for web page, BGW 130 routes the request to the appropriate content server 150. The terms BGW and the Border Router may be used interchangeably throughout this description. In the download direction BGW 138 receives incoming packets from the different content servers 150 and distributes them to the appropriate modules of the SPP 130. Usually packets that are targeted toward an endpoint computer are transferred to the AGW 132.

An exemplary embodiment of Surfing Acceleration Server (SAS) 134 can be capable of improving a user's experience while surfing the Internet by combining several browser objects, which do not presently exist in the cache of the user's device, into a compound object. An exemplary SAS 134 can intercept traffic being communicated between the AGW 132 and the BGW 138 and receives all the packets that are flowing between the AGW 132 and the BGW 138. Therefore SAS 134 receives the data transportation that is transferred between the plurality of endpoint computers 110 and the plurality of the content servers 150.

In one exemplary embodiment, SAS 134 may be configured as the default gateway for both sides of the SPP 130, (i.e., for AGW 132 and for the BGW 138). In another exemplary embodiment, the SAS 134 may physically reside between the AGW 132 and the BGW 138. In both cases, the SAS 134 may be transparent to both sides of the connection, to the endpoint computer 110 or to the content servers 150. In alternate exemplary embodiment of the present invention, the SAS 134 may be used as a non-transparent HTTP proxy for example. In such a an embodiment, the endpoint computers 110 can be configured to include SAS 134 as their HTTP proxy, for example. In another exemplary embodiment of the present invention, the SAS 134 can be configured as a transparent HTTP proxy. Such an embodiment may use redirection method.

A common data session between a user 110 and a content server 150 may consist of a large number of transactions. Each transaction comprises a request, which is followed by a response. An exemplary SAS 134 is adapted to intercept the transportation between the content servers 150 and the users 110, and to create one or more compound objects, multipart object for example. Each compound object consists of two or more independent browser objects. A browser object is an object that is fetched automatically by a browser. The SAS 134 is further adapted to modify received ML files coming from the servers 150 to include links to those multipart objects instead of the browser links to the browser objects that are contained within the relevant multipart object.

An exemplary SAS 134 can collect information regarding the content of the cache of a requesting browser. The information can be collected by using cookie mechanism, for example. In addition, information regarding the objects that are embedded within a compound object can be added to a URL that represents the compound object.

Consequently the transportation between the users 110 and the content servers 150 is reshaped. The number of transactions is reduced from a plurality of transactions, wherein each one is associated with one object, to a fewer number of transactions. Wherein each transaction is associated with a compound object (a multipart object, for example). The compound object can be compounded from a plurality of individual objects which do not exist in the requesting browser's cache. More information on the operation of SAS 134 is depicted below in conjunction with FIGS. 2-5.

Figure 2:
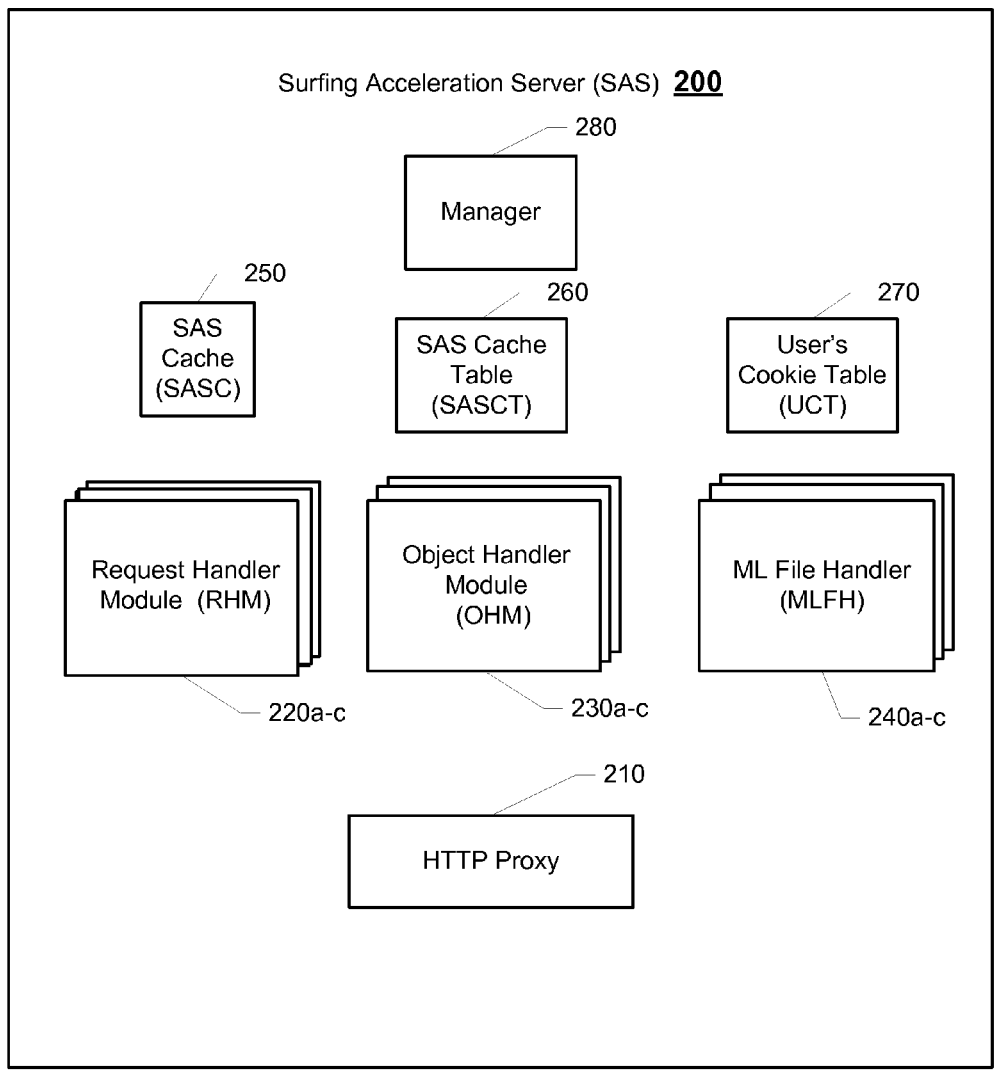
FIG. 2 illustrates a block diagram of relevant modules of an exemplary embodiment of the present invention.

FIG. 2 is a block diagram with relevant elements of a Surfing Acceleration Server (SAS) 200 that operates according to an exemplary embodiment of the present invention. The SAS 200 may be associated with an SPP 130 (FIG. 1) as an intermediate node between the AGW 132 and the BGW 138. Within the context of the Open System Interconnection (OSI) Reference Model seven layer communication stack, an exemplary SAS 200 can be implemented by modules on top of an HTTP proxy.

An exemplary embodiment of an SAS 200 can be operative to shape the traffic between a plurality of surfers 110 (FIG. 1) and a plurality of content servers 150 (FIG. 1). In an exemplary embodiment of the present invention the SAS 200 can be configured as a proxy at the remote endpoint computers 110. In such an embodiment of the present invention an exemplary SAS 200 may comprise an HTTP proxy 210. In addition, the SAS 200 can comprise: one or more Request Handler Modules (RHM) 220*a-c*, adapted to handle requests coming from the endpoint computers 110*a-c* (FIG. 1) that are currently transferred via SAS 200; one or more Object Handler Modules (OHM) 230*a-c*, adapted to handle objects that are not ML files and are currently transferred via SAS 200; one or more ML File Handler Modules (MLFH) 240*a-c*, adapted to handle ML files that are currently transferred via SAS 200; a cache of SAS 200 (SASC) 250; a table of the intermediate device cache (SASCT) 260; a user's cookie table (UCT) 270 and a manager 280. It will be appreciated by those skilled in the art that depending upon its configuration and the needs, the SAS 200 may comprise more than three of RHM 220*a-c*, OHM 230*a-c* and MLFH 240*a-c*. However, for purposes of simplicity of understanding, three units of each are shown. In the summary section the SASC was referred as IDCT.

In exemplary embodiments of the present invention in which the communication between the modules of the SPP 130 (FIG. 1) is based on IP, HTTP proxy 210 can be adapted to handle the first four layers of the OSI seven layer communication stack. The layers can be the Physical Layer 1, Link Layer 2, Network Layer 3, and the Transport Layer 4 (the TCP stack). In exemplary embodiments of the present invention, in which the SAS 200 is transparent to the terminal 110 (FIG. 1), as well as to the content servers 150 and portal 137 (FIG. 1), the HTTP proxy 210 may behave as a transparent proxy and may use a redirector, for example. The transparent HTTP proxy 210 can be adapted to collect packets coming from the plurality of terminals 110 (FIG. 1) toward the plurality of the content servers (150/137) and transfer requests and responses toward the internal modules of SAS 200. HTTP requests coming from endpoint computers 110*a-c* are transferred toward the RHM 220; HTTP responded objects that are not ML files are transferred toward the OHM 230*a-c*; and ML files are transferred toward the MLFH 240*a-c*. In an alternate exemplary embodiment of the present invention in which the SAS 200 can be configured as an HTTP proxy at the terminals 110 (FIG. 1), the redirector is not needed.

In the other direction (from the internal modules of SAS 200), an exemplary HTTP proxy 210 can be adapted to get processed (modified) requests and/or responses from the internal modules of the SAS 200; to arrange the modified requests and/or responses according to the communication protocol into IP packets and transmit the packets according to the destination address. The destination address can be the appropriate user via the AGW 132 (FIG. 1). Alternatively, the destination address can be the portal 137 (FIG. 1) or the appropriate content server 150 (FIG. 1) via the BGW 138.

Manager 280 can be a module which is initiated during power on of the SAS 200. An exemplary manager 280 can create a bank of software codes such as JavaScript functions to be used later by the MLFH 240 while modifying an ML file. The software code will be used during the operation of the SAS 200 as it is disclosed below. The manager 280 can create the structure of the SASCT 260 and the UCT 270. After preparing the accessory elements of the SAS 200, the manager 280 can allocate resources to each one of the internal modules of the SAS 200 (RHM 220; OHM 230; and MLFH 240) and may initiate them. During operation, the manager 280 can monitor the operation of the SAS 200 and in cooperation with the HTTP proxy 210, it may create or release one or more modules 220a-c to 240a-c. The manager 280 can include a cache updating program. The cache updating program will be initiated from time to time and scan SASC 250 in order to delete or update stored objects that their expiration date was expired. In an exemplary embodiment of the present invention the manager 280 can include a UCT releasing program. An exemplary UCT releasing program can monitor the activity of each session between a user and a host. Upon determining that the session is idle, then the relevant entry in the UCT can be released. The decision can be based on the duration from the last transaction.

The SASC 250 can be a database, a persistence memory, or a cache proxy, for example, that stores information on the plurality of requested objects that were received from content servers 150 (FIG. 1). Information related to the different objects stored in the cache can be written in the SASCT 260. In an alternate exemplary embodiment of the present invention, the cache 250 can be a commercial cache server or proxy that is associated with SAS 200.

The SASCT 260 is a table used for storing information regarding files that are stored in the SASC 250. The structure of the SASCT 260 can be created by the manager module 280 during the initiation process. Each entry in the SASCT 260 can be associated with a stored file in the SASC 250. Each entry can include fields like, but not limited to: the URL of the object; it's representing hash value; an expiration date; physical location in the SASC 250. In addition, each entry may include fields for monitoring and managing information, such as but not limited to: the last time the stored file was sent to a user, the number of times it was sent to users, etc. The SASCT 260 can be updated together with the SASC 250.

The UCT 270 is a table for storing cookies' information, which were received from user's equipment 110 (FIG. 1) upon requesting a web-page. The structure of UCT 270 can be created by manager module 280 during the initiation process. Each entry in the UCT 270 can be assigned to a user 110 and a content-server 150 (FIG. 1) that are currently communicating. Each entry can include, among other, fields like the user's IP address, the user's ID (an MSISDN, for example), a server IP address and fields for storing content of relevant cookies. A stored cookie in the UCT 270 can be used for preparing a new cookie to be sent to the requester's endpoint when responding to a request for a new compound object. The new cookie will represent the compound objects that are expected to be stored at the browser's cache and the new requested compound object. An entry in the UCT 270 can be released upon determining that the communication session is idle.

The MLFH 240 can be a module capable of handling ML-files, such as HTML files that are transferred from content servers 150a-c (FIG. 1) to endpoints 110a-c (FIG. 1) via SAS 200. An exemplary MLFH 240 is adapted to search the HTML file looking for browser links. An exemplary browser link can have a scheme such as, but not limited to, http://www.flashnetworks.com/images/1.gif. One or more browser links can be modified, for example a browser link can be covered creating a covered link or covered URL. The cover prevents the requesting browser from identifying the original link and requesting the covered browser objects. An exemplary cover can be a string such as FN: that is added as a prefix to the source attribute of the link. An exemplary covered link can have a scheme such as but not limited to FN:http://www.flashnetworks.com/images/1.gif In an alternate exemplary embodiment of the present invention a modification of a browser link can comprise replacing the link to a browser object with a link to a compound object, such as but not limited to multipart. Wherein the compound object includes the relevant browser object.

In this disclosure, the term URL refers to the absolute description of the URL. In some instances, the original browser link is a relative link. A relative link can be relative to the location of the ML file or to an existing "HTML BASE TAG", for example. In these instances, the relative URL is normalized to its absolute description. After resuming the absolute description, the absolute description is used.

According to the URL of each browser link the SASCT 260 is searched for an associated entry. If an entry is not found, a new entry is allocated, the URL is written in the appropriate field and a request to fetch the browser object can be sent according to the browser link. An indication that the request is initiated by the MLFH 240 can be written in the appropriate field in the relevant entry of the SASCT 260.

In some embodiments, a hash value that represents the URL of the link is calculated. The hash value can be calculated using functions that are known to those skilled in the art. Functions such as, but not limited to, MD2, MD5 or SHA-1 can be used. A hash function transforms data into a value of fixed length (hash value) that represents the original data. Using the technique of hash values reduces the size of each URL and enables combining hash values of several URLs into one URL of a compound object. The length of the calculated hash value can be 4 bytes, for example. Other exemplary embodiments may use other lengths of hash values, or any other representing method, such as calculating a value cyclic redundant code (CRC) of the URL as a non-limiting example. In some exemplary embodiments of the present invention, the representing value can be the URL itself. The number of URLs that are combined into one compound URL can be limited in order to comply with recommendations of the communication protocol. The representing term (the hash value, for example) is written in the appropriate field in the relevant entry of SASCT 260. As written above, a hash value is calculated for the absolute description of a URL.

During the above described process, an ML list of browser links can be created. Each entry in the ML list is associated with a browser link and can include its URL and its hash value. Hash values of browser objects, which have an entry in the SASCT 260, are retrieved from their entries in the SASCT 260. At the end of this process, an exemplary ML-list of a received HTML file that has five browser links can be illustrated as shown in Table 1.

TABLE 1

An ML-list with 5 browser objects after calculating the hash values:

| URL of a browser's object | Its hash value | URL of stored multipart object |
|---|---|---|
| A | a | |
| B | b | |
| C | c | |
| D | d | |
| E | e | |

Based on the user's ID and the host name (location) of the received HTML, an entry in the UCT 270 is searched for a relevant cookie. The cookie, if one exist, was received from the relevant user to which the current HTML file is sent and is related to the content server, which is the source of the received HTML file. The cookie can include information that is related to one or more browser objects that are expected to be stored at the cache of the requesting endpoint's browser. The information can include the representation of URLs of the browser's object, their expiration dates, etc. An exemplary cookie can define one or more URLs of multipart objects. The URL of the multipart object is combined from the representation values (the hash values) of the URL of the browser objects that compose the multipart object.

For each multipart object represented in the cookie, its date of expiration is checked for validity, and then the hash value of each entry in the ML-list is compared to the hash values that compose the URL of the multipart object. If a match is found, the URL of the relevant multipart object is written in the appropriate field of the entry. Table 2 illustrates the ML-list after considering the cookie data.

TABLE 2

A ML-list with 5 browser's objects after considering the relevant cookie:

| URL of a browser's object | Its hash value | URL of expected stored multipart object |
|---|---|---|
| A | a | a_c_f |
| B | b | |
| C | c | a_c_f |
| D | d | |
| E | e | |

In the example of Table 2, browser objects A and C are expected to be stored in the cache of the requesting browser as part of multipart object a_c_f. Browser objects B, D and E will be requested by the requesting browser, since they are not stored in its cache. In this example, two multipart objects can be used, the one that is already stored at the cache a_c_f and a new one that has to be prepared and be requested by the browser. The new one will include the three missing browser's objects B, D and E. In order to enforce the browser to use the multipart objects additional browser's links that are associated with the compound object can be added to the HTML file. Alternatively or additionally, existing browser links can be modified to be associated with the compound object.

Several criteria can be used for sorting objects into a multipart objects. Exemplary criteria can be the expiration date of objects, size of objects, location in the page, etc.

More information on combining multipart objects can be found in U.S. patent application Ser. No. 11/686,495 and in other documents.

A first additional browser link can be added to the modified HTML file. The first additional browser link can request a software code such as but not limited to JavaScript. The JavaScript can be embedded within a compound object, such as multipart object that includes the objects that do not exist in the cache of the browser. Objects B, D and E of the example of Table 2. Therefore, the URL of the multipart object will include the representation of the URL, the hash values, of the missing browser objects B, D and E. The URL of the multipart object can be b_d_e. An exemplary first additional link can have the shape of mhtml:http://SAS/b_d_e.mht!http://SAS/b_d_e.js The JavaScript can be adapted to instruct the requesting browser to search the modified ML file, which is currently parsed by the browser, looking for covered links (objects), which are embedded within the multipart object. Accordingly, the JavaScript can have a list of searching strings. Each searching string can represent the "cover", such as FN:, and the original URL of the object that is embedded within the created multipart object. For the above example of Table 2, the relevant covered browser links are B, D and E. Therefore, the three searching strings can be FN:B, FN:D and FN:E.

For each found cover link, which is in the list, the browser is instructed to remove the cover and to modify the uncovered URL of the found object to point at the URL of the relevant multipart object and the location of the found object. In an exemplary embodiment of the present invention, which uses a multipart objects that comply with Microsoft mhtml scheme, the modified uncovered URL of browser object B, D and E of the example of Table 2 can respectively have the form of mhtml:http://SAS/b_d_e.mht!http://B.
mhtml:http://SAS/b_d_e.mht!http://D. and
mhtml:http://SAS/b_d_e.mht!http://E.

Each modified uncover URL points the compound object and the original URL. In the example of using Microsoft mhtml scheme the symbol ! separates between the two URLs, the multipart URL and the original URL of the object.

A second browser link can be added to the modified HTML file. The second browser links can request a JavaScript, which is embedded within a multipart object that exists in the cache of the browser, the second multipart object (objects A and C of the example of Table 2). The URL of the second multipart object is copied from the cookie. For the example of Table 2, the URL of the second multipart object can be a_c_f.

The JavaScript was adapted to instruct the requesting browser to search the modified ML file, which is currently parsed by the browser, looking for covered links (objects) embedded within the second multipart object. Accordingly, the JavaScript can deliver a list of search strings. For the above example of Table 2, the list of search strings can be FN:A, FN:C and FN:F.

For each found covered link, which is in the list of the JavaScript, the browser is instructed to remove the cover and to modify the uncovered URL of the found object to point at the URL of the relevant multipart object and the location of the found object. In the above example of Table 2 the modified uncovered URL of browser object A, and C can have, respectively, the form of mhtml:http://SAS/a_c_f.mht!http://A; and
mhtml:http://SAS/a_c_f.mht!http://C.

A similar link to JavaScript files can be added for additional multipart objects, if they exist, in the ML-list. In addition to the additional browser links to the JavaScript, instructions to activate the JavaScript are added to the modified ML file. After covering all the objects that are listed in the exemplary ML-list, a link to a final JavaScript is added at the end of the modified HTML file. The final JavaScript is not embedded in a multipart object. The final JavaScript can be a script that was created by the manager 280 and be stored at the cache 250. An exemplary final JavaScript can be adapted to search the modified HTML, from the beginning, looking for left behind covered links and removes the cover (the string FN:, for example) as well as revealing the original browser's link. In an alternate embodiment of the present invention the final JavaScript itself can be embedded within the modified HTML file instead of a link to it.

In an embodiment of the present invention, in which a link to a browser object is replaced with a link to a compound object that includes to relevant browser object.

Then a response to a request to a compound object, which is unknown to SAS 200, can be responded by a compound object that includes a code such as JavaScript. The code can instruct the browser to replace the link to the compound object with the original link of the relevant browser object.

Yet in other exemplary embodiments, a software code can be such as but not limited to ActiveX code. In such embodiments, additional browser links can be added to the modified ML file. Those links can point the one or more batches of ActiveX code. An ActiveX code can be designed to perform similar tasks as performed by the JavaScript codes. In addition the ActiveX can add capabilities to the browser. Exemplary capabilities can be handling of a compound objects. An exemplary ActiveX code can fetch the compound object and stored the included objects in the browser cache.

At this point of time the MLFH 240 can send the modified HTML file via the HTTP proxy 210 toward its destination, the requesting endpoint 110. The entry in the UCT 270 that was associated to this session can be released and MLFH 240 is ready to process a next ML file. In other exemplary embodiments of the present invention, the entry in the UCT can be released upon determining that the session between the user and the content server (domain) become idle. More information on the operation of the MLFH 240 is depicted below in conjunction with FIG. 3.

The RHM 220 is a module capable of handling requests coming from the endpoint computers 110*a-c*. A request can be a request for an HTML file (a web-page); or for a software code embedded within a compound object such as a JavaScript embedded within a multipart object; or for a common object such as an image, a JavaScript, a CSS file, etc. A request for an ML-file is parsed and the UCT 270 is searched for an entry that is allocated to the session between the client and the server. If an entry was not found, then an entry is allocated. Session identification parameters such as, but not limited to, the user ID number and the domain name of the content server can be written in the appropriate fields of the entry. A user ID can be an MSISDN (Mobile Station International Subscriber Directory Number) for example. The MSISDN can be delivered from another node in the SPP 130 (FIG. 1). After allocating a new entry or if an entry was found, then the content of a received cookie, if one exist, is stored in the appropriate field of the entry. After updating the UCT 270 the request is transferred toward the destination content server 150.

An exemplary RHM 220 can be adapted to respond to a request for a JavaScript, which is embedded within a multipart object, by parsing the URL of the multipart object. Based on the hash values that compose the multipart URL, the RHM 220 creates a request-list of browser's objects that are embedded within the relevant multipart object. Per each hash value an associated entry in the SASCT 260 is searched and its real URL and its location in the SASC 250 are copied to the Request-List. According to the request-list, the RHM 220 can collect the objects from the SASC 250 and combine them into a multipart object according to Microsoft mhtml scheme, for example.

The requested JavaScript can be added to the compound object with the combined browser's objects. The JavaScript have the format of the first JavaScript functions that are disclosed above in conjunction with the MLFH 240 with some modifications for adapting the JavaScript to its associated multipart object.

Before sending the requested multipart object, an updated cookie is generated. The updated cookie can report the URL of valid multipart objects that are stored in the cache of the browser according to the content stored at the relevant entry in UCT 270, and the URL of the current requested multipart object, which represents the browser's objects that are combined in the compound object. In a subsequent surfing for the same site, the updated cookie will inform the MLFH 240 about the compound objects that are expected to be stored at the cache of the requesting browser, as well as additional information such as but not limited to expiration date of the compound objects. After setting the updated cookie, the multipart object with its associated cookie are sent toward the requesting endpoint 110*a-c* via HTTP proxy 210. The entry in the UCT 270 can be updated to reflect the updated cookie.

An exemplary RHM 220 can be adapted to respond to a problematic request for a compound object by creating a compound object that includes another type of JavaScript function, an Idle JavaScript. The Idle JavaScript can be created by manager 280, during initiation, and be stored in cache 250. The idle function does not perform any functions. Exemplary problematic request for compound objects can be a request for a JavaScript that is embedded within a previously sent multipart object (the requested multipart object is listed in the cookie stored at the relevant entry in the UCT 270), or a request for a multipart object that one of its embedded objects does not exist in the SASC 250, etc. In parallel an updated cookie can be generated by removing the representation of the requested compound object from the stored cookie in the relevant entry in the UCT 270.

When it occurs that the request is a request to an object, such as an image, JavaScript file, CSS, etc. the SASCT 260 is searched for determining whether the object is stored in the SASC 250. If an entry is found, and the stored object is valid, the object is retrieved from the SASC 250 and then sent to the requester endpoint 110*a-c* (FIG. 1). Relevant fields in the entry can be updated. Fields such as the time of the last request, etc. If an entry was not found, then an entry is allocated in the SASCT 260, the URL of the object is written in the appropriate field; a representing term for the URL, its hash value, is calculated by the RHM 220 and is written in the entry; an indication that the object was requested by a user can be written too. Then the request for the object is sent toward the destination content server 150*a-c*. More information on the operation of the RHM 220 is depicted below in conjunction with FIG. 4.

An exemplary OHM 230 is a module capable of handling objects other than ML files that were sent from one of the content servers 150*a-c* (FIG. 1), such as CSS, images, JavaScript, etc. A received object can be requested by one of the endpoints 110*a-c* (FIG. 1).

If the object was requested by a browser from an endpoint 110*a-c*, then the received object is stored in the SASC 250 and the entry in the SASCT 260 is updated accordingly with the location in the SASC 250 and the receiving time, expiration date, etc. Then the object is sent toward the destination endpoint 110*a-c*.

Figure 3:
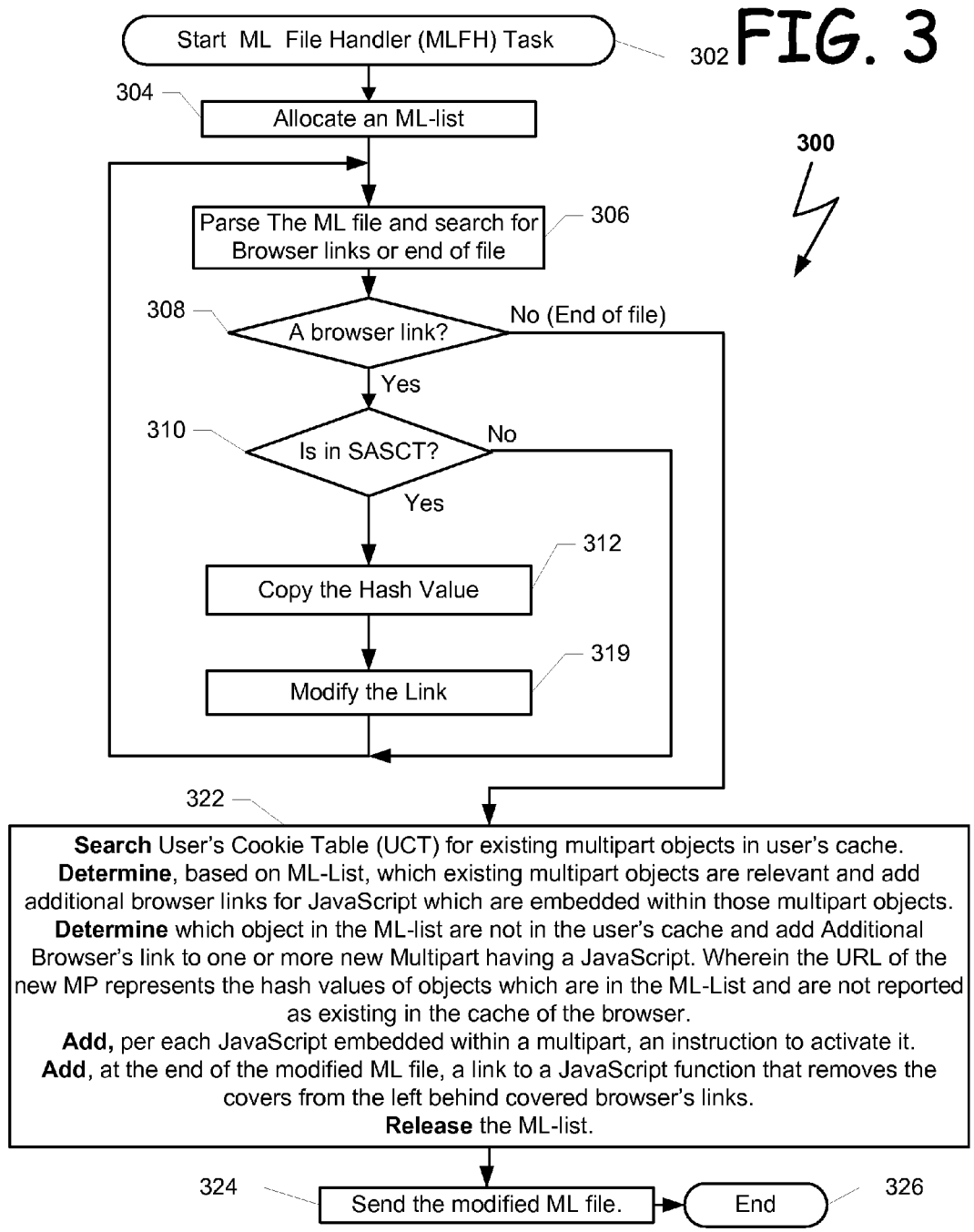
FIG. 3 illustrates a flowchart with relevant steps of an exemplary method that may be used by an exemplary ML-File handler module.

FIG. 3 is a flow diagram illustrating relevant steps of an exemplary process 300 that can be used for handling an ML file, such as HTML file for example. Further, the process describes steps that occur when the HTML file is transferred from a content server 150 to an endpoint 110 via SAS 200. Method 300 can be implemented by the MLFH 240 (FIG. 2). The task 300 can be initiated by the MLFH 240 upon receiving a new HTML file via the HTTP proxy 210. Several tasks 300 can run in parallel, one per each HTML file, depending on the load over the SAS 200 and the available resources. In alternate exemplary embodiment (not shown in the drawings) process 300 can run in a loop. A loop can be initiated per each received HTML file.

After initiation 302, resources for an ML-list are allocated 304 and a table is created for the ML-list. Each entry in the table will be associated with a browser link from the HTML file. The fields of the ML-list can include the URL of the browser's link; its calculated hash value and the URL of a relevant multipart object that can exist in the cache of the requesting endpoint 110 (FIG. 1). After creating the ML-list, the HTML file is parsed 306 looking for browser links or the end of the HTML file. If a browser link is found 308 the SASCT 260 (FIG. 2) is searched looking for 310 an entry that is associated with the current browser link. If 310 an entry is not found, method 300 returns to step 306. If 310 an entry is found, the hash value that is written in the entry of SASCT 260 is copied 312 to the appropriate field in the relevant entry of the current browser object in the ML-list. Then the HTML file is modified, and the current browser link is modified 319, by adding a cover before the link, for example. For example adding a string such as FN: in front of the link, as it is depicted above in conjunction with HTML 240.

In an alternate embodiment of the present invention the modification of the browser link can be replacing the link to the relevant object with a link to a compound object that includes the relevant browser object.

After modifying 319 the browser link, method 300 returns to step 306 and continues parsing the HTML file looking for a subsequent browser link or the End of File indication. If 308 method 300 does not find any browser links, it reaches an End of File indication and method 300 proceeds to step 322 and continues the manipulation of the HTML file at step 322.

During process 322 The UCT can be searched for an entry that is associated with the session (the session between the user and the content server). If an entry was found, then the URL of one or more multipart objects that were embedded in the cookie that was associated with the request are retrieved. The URLs indicate multipart objects that can be stored in the cache of the requesting browser. The hash values that are listed in the ML-list are compared with the hash values that construct the URL of the multipart objects that are written in the relevant entry of the UCT. An additional browser link is added to the modified HTML file per each written multipart object that includes at least one hash value of an object listed in the ML-list. The additional browser link requests a JavaScript that is embedded within the relevant multipart object.

Additional one or more browser links can be added to the modified HTML file. Each browser link can request a JavaScript that is embedded within a new multipart object. Wherein the URL of the new multipart object includes the hash values of the browser objects in the ML-List and are not reported as existing in the cache of the browser. The URL of each multipart object can include a prefix that indicates that the multipart object is originated by the SAS 200. For each JavaScript, an instruction to activate it is added to the modified ML file.

A link to a final JavaScript function can be added at the end of the modified HTML file. The final JavaScript can be a common object that is not embedded in a multipart object. An exemplary final JavaScript can be adapted to search the modified HTML, from the beginning, looking for left behind covered links and removing the cover (the string FN:, for example) revealing the original browser link. In an alternate embodiment of the present invention the final JavaScript itself can be embedded within the modified HTML file instead of a link to it.

At this point in time, the modified HTML file is ready, including the resources of the ML-list. Then, the modified HTML file is sent 324 via the HTTP proxy 210 toward its destination, the requesting endpoint 110 and method 300 can be terminated 326.

Figure 4:
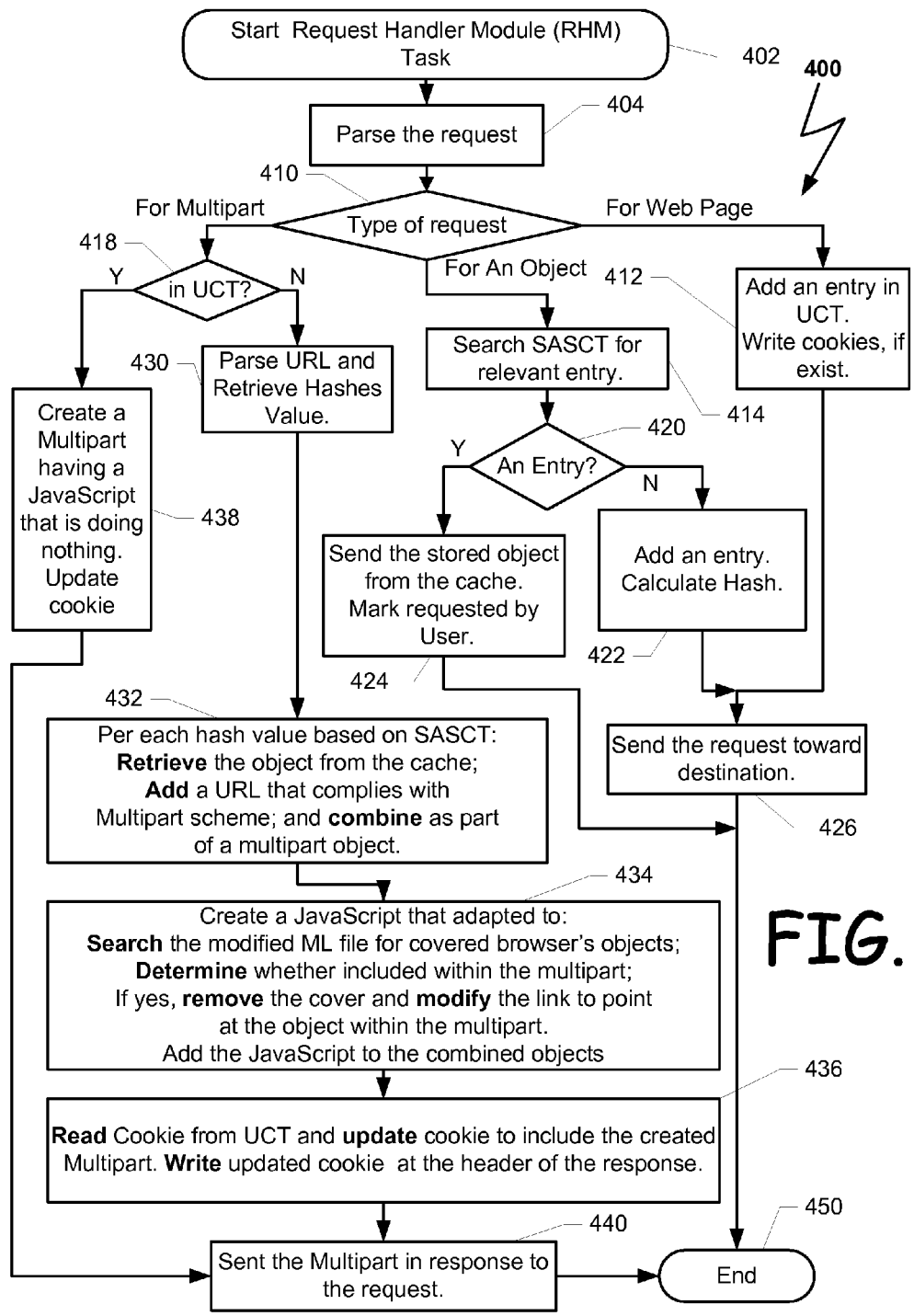
FIG. 4 illustrates a flowchart with relevant steps of an exemplary method that may be used for processing a request.

Referring now to FIG. 4, which illustrates a flowchart with relevant processes of an exemplary method 400 that can be used for handling a request that was sent from an endpoint 110 (FIG. 1). The method 400 can be implemented by the RHM 220 (FIG. 2), for example. The task 400 can be initiated by the RHM 220 upon receiving a new request via the HTTP proxy 210. Depending on the load over the SAS 200 and the available resources, several tasks 400 can run in parallel, one per each request. In an alternate exemplary embodiment (not shown in the drawings) process 400 can run in a loop. A loop can be initiated per each received request.

After initiation, the request is parsed 404 and a decision is made 410 whether the request is for a JavaScript embedded within a multipart object created by the SAS 200 (FIG. 2); or for an object located at a content server 150 (FIG. 1); or for an ML file, such as an HTML file from a content server 150. If 410 the request is for an HTML file, then an entry in the UCT 270 (FIG. 2), if one does not already exist, is allocated 412 for the session. The user ID, as well as the URL of the content server, are written in the appropriate fields of the entry. The content of a cookie, if one exists, is written in the appropriate field of the entry. The content of the cookie includes a URL of one or more multipart objects that were sent to the requesting browser during previous sessions. Therefore, those objects are expected to be stored at the cache of the requesting browser. After updating 412 the UCT, the request for the HTML file is sent 426 toward its destination, the relevant content server 150, via HTTP proxy 210 (FIG. 2) and method 400 can be terminated 450.

If 410 the request is for an object located in a content server 150, then the SASCT 260 (FIG. 2) is searched 414 for an entry that is associated with the requested object. The object can be a common object such as an image, a JavaScript, a CSS file, etc. If 420 an entry is found, indicating that the requested object is stored in the SASC 250 (FIG. 2), then the object is fetched from the SASC 250 and is sent 424 toward the requesting browser in response to the request. The entry in the SASCT is updated indicating that the object was requested by an endpoint 110 (FIG. 1) and method 400 terminates 450.

If 420 an entry was not found in the 260, then an entry is allocated for the request. The URL of the request is written 422 in the appropriate field; a hash value representing the URL is calculated and written in the appropriate field of the new entry. After updating 422 the SASCT 260, the request is sent 426 toward the relevant content server 150 and method 400 terminates. The hash value can be calculated using techniques such as but not limited to MD2, MD5 or SHA-1.

If 410 the request is for a JavaScript embedded within a multipart object that was originated by the SAS 200 (FIG. 2), then the UCT 270 (FIG. 2) is searched for the entry that is relevant to the session and the stored cookie is retrieved and parsed. If the URL of the requested multipart object is included in the stored cookie, it indicates a mismatching between the cookie and the real information stored at the cache of the requesting browser. In such a case, a multipart object is created 438. The multipart object includes an idle JavaScript that does not perform any functions. In addition, the cookie at the relevant entry is updated and the requested multipart object that is not stored at the cache is removed from the cookie and the updated cookie is written in the header of the response that carries the created multipart object. The response is sent 440 to the requesting browser via the HTTP proxy 210 (FIG. 2).

If 418 the requested multipart object is not included in the cookie stored at the relevant entry of the UCT 270, then the URL of the multipart object is parsed 430 and the hash values of objects that compose the requested multipart object are retrieved from the URL. A request-list of hash values of browser objects that need to be embedded within the relevant multipart object can be created. For each hash value, an associated entry in the SASCT 260 is searched. The full URL and the location of the object at the SASC 250 are copied to the Request-List. Based on the request-list, the RHM 220 can collect 432 the objects from the SASC 250 and combine them into a multipart object according to Microsoft mhtml scheme, for example.

The requested JavaScript can be created 434 and added to the compound object with the combined browser's objects. The requested JavaScript can be created as it is disclosed above in conjunction with the MLFH 240 (FIG. 2), with some modifications for adapting the JavaScript to its associated multipart object. An exemplary adaptation can include the request list, which reflects the objects embedded within the created multipart object; instructing the browser to search the modified HTML for covered browser objects that are included in the request list; remove the cover and modify the uncovered link to point at the object within the associated multipart object. The modification can comply with mhtml scheme, for example. If the request is for a multipart object that cannot be created, then the exemplary method 400 can continue from step 438 and respond with multipart object having an Idle JavaScript.

The cookie, if one exists in the relevant entry of the UCT 270 (FIG. 2), and has been fetched in step 418, is updated 436. The multipart objects that are already written in the cookie can be checked for validity and if valid, then with the URL of the requested multipart object can compose the updated cookie. After setting the updated cookie at the header of the response that carries the multipart object, it is sent 440 toward the requesting browser 110a-c via the HTTP proxy 210.

Figure 5:
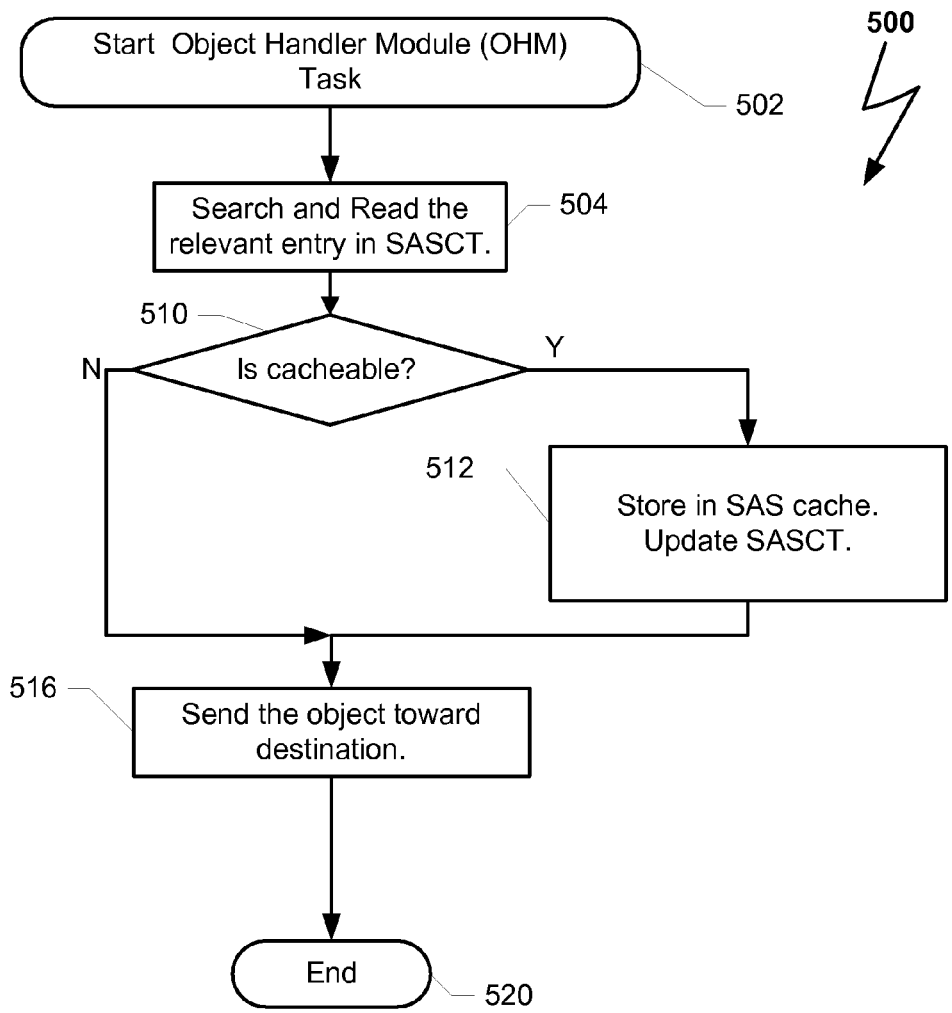
FIG. 5 illustrates a flowchart with relevant steps of an exemplary method that may be used for processing a received object.

FIG. 5 is a flow diagram illustrating steps in a relevant processes of an exemplary method 500 that can be used for handling received objects, such as but not limited to CSS, images, JavaScript, text, etc. Wherein the object is transferred from a content server 150 to an endpoint 110 via the SAS 200. The method 500 can be implemented by the OHM 230 (FIG. 2), for example. The task 500 can be initiated by the OHM 230 upon receiving a new object via the HTTP proxy 210. Several tasks 500 can run in parallel, one per each HTML file. In an alternate exemplary embodiment (not shown in the drawings) the process 500 can run in a loop. A loop can be initiated per each received object.

The received object is parsed and based on its URL, a relevant entry in the SASCT 260 (FIG. 2) is searched and retrieved 504. A decision is made whether 510 the object is cacheable, the object is stored 512 at the SASC 250 (FIG. 2) and the relevant entry in the SASCT 260 is updated to include the location of the stored object in the SASC 250, otherwise 510 it is not stored in the cache. Then the object is sent 516 toward its destination (the requesting browser) via the HTTP proxy 210 (FIG. 2) and method 500 terminates 520.

Overall, various embodiments of the present invention operate to improve the experience of a surfer while surfing the Internet, reduces the rendering time of a web-page and reduces the load between a plurality of surfers and a plurality of servers.

In the description and claims of the present application, each of the verbs, "comprise" "include" and "have", and conjugates thereof, are used to indicate that the object or objects of the verb are not necessarily a complete response-listing of members, components, elements, or parts of the subject or subjects of the verb.

In this application the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware. It will be appreciated that the above described modules may be varied in many ways, including, changing the number modules, and combining two or more modules into one. Dividing the operation of a certain module into two or more separate modules, etc. Software of a module can be embodied on a computer readable medium such as a read/write hard disc, CDROM, Flash memory, ROM, etc. In order to execute a certain task a software program can be loaded to an appropriate processor as needed.

It will be appreciated that the above described methods may be varied in many ways, including, changing the order of steps, and the exact implementation used. It should also be appreciated that the above described description of methods and apparatus are to be interpreted as including apparatus for carrying out the methods and methods of using the apparatus.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

What is claimed is:

1. A method that improves data transportation between a plurality of endpoints and a plurality of content servers, wherein the transportation between the endpoints and the content servers is based on the Internet Protocol ("IP"), the method comprising the actions of:
    intercepting a data transportation between the plurality of endpoints and the plurality of content severs at an intermediate device, wherein the data transportation is a markup language ("ML") file originating from a content server and directed toward a destination endpoint that requested the ML file;
    modifying the intercepted ML file to add:
        a browser link associated with a compound object; and
        an instruction to activate a software code that is embedded within the compound object;
    sending the modified ML file toward the destination endpoint;
    the intermediate device receiving a request from the destination endpoint for the compound object, wherein the request was generated by the destination endpoint because of the added browser link associated with the compound object;
the intermediate device responding to the request for the compound object by:
identifying and retrieving one or more browser objects from a cache;
embedding the retrieved one or more browser objects into the compound object;
embedding the software code into the compound object; and
sending the compound object to the destination endpoint;
wherein the software code, when activated at the destination endpoint per the added instruction, is operable to adapt the modified ML file to enable retrieval of the one or more browser objects that were embedded into the compound object.

2. The method of claim 1, wherein the software code enabling retrieval of the one or more browser objects comprises instructing a browser application at the destination endpoint to:
verify that the browser object is included in the compound object; and
if the browser object is included in the compound object, then uncover a browser link associated with the browser and modify the uncovered browser link to point to the compound object; and
if the browser object is not included in the compound object, then searching for a next covered browser link.

3. The method of claim 1, wherein the software code enabling retrieval of the one or more browser objects comprises instructing a browser application at the destination endpoint to:
verify that the browser object is included in the compound object; and
if the browser object is not included in the compound object, then convert the link associated with the compound object into a link that points to the browser object.

4. The method of claim 1, wherein the browser link associated with the compound object represents a uniform resource locator ("URL") for the one or more browser objects embedded into the compound object, and the action of identifying and retrieving one or more browser objects utilizes this URL.

5. The method of claim 1, wherein the action of modifying an intercepted ML file to add a browser link associated with the compound object and an instruction to activate a software code further comprises including a link for requesting the software code.

6. The method of claim 1, wherein the action of embedding the retrieved browser objects into the compound object further comprises creating a multipart object that complies with Microsoft mhtml scheme.

7. The method of claim 1, wherein the action of embedding the software code into the compound object further comprises embedding software code that is a JavaScript.

8. The method of claim 1, wherein the action of modifying an intercepted ML file further comprises the action of modifying an HTML file.

9. The method of claim 1, further comprising the action of processing the intercepted ML file by:
searching the ML file for browser links; and
for each browser link found:
calculating a hash value that represents a URL for the browser link; and covering the browser link.

10. The method of claim 9, wherein the action of modifying the intercepted ML file to add a browser link associated with a compound object further comprises including the hash values of the URL of the one or more browser objects embedded into the compound object.

11. The method of claim 9, wherein the action of embedding the software code further comprises embedding a software code that, when executed by the browser application, is capable of removing the cover from browser links of objects that are embedded in the compound object.

12. The method of claim 9, wherein the action of processing the intercepted ML file further comprises the action of associating a second software code with the modified ML file that is operable to remove the covers from one or more left behind covered browser links.

13. The method of claim 1, further comprising the action of maintaining information about previous compound objects that were sent to a destination endpoint.

14. The method of claim 13, wherein the action of maintaining the information about previous compound objects further comprises implementing the action by a cookie mechanism.

15. The method of claim 13, wherein the action of embedding the one or more retrieved browser objects into the compound object further comprises embedding browser objects that were not embedded into a previous compound object sent toward the destination endpoint.

16. A Surfing-Accelerating Server ("SAS") that improves the transportation of markup language ("ML") content between a plurality of endpoints and a plurality of servers, comprising:
a memory;
an ML file handler processor configured to:
process a received ML file and modify it to add a browser link associated with a compound object and an instruction to activate a software code that is embedded within the compound object; and
send the modified ML file toward a destination endpoint; and
a request handler processor configured to respond to a request from the destination endpoint for the compound object by:
identifying and retrieving one or more browser objects;
embedding the retrieved one or more browser objects into the compound object;
embedding the software code into the compound object; and sending the compound object toward the destination object;
wherein the software code, when activated by a browser of the destination endpoint per the added instruction, is operable to adapt the modified ML file to enable retrieval of objects that are associated with the compound object;
wherein the SAS is installed in an intermediate node positioned between the plurality of endpoints and the plurality of servers and wherein the communication between the endpoints and the servers is based on Internet Protocol (IP); and
wherein the compound object comprises two or more independent browser objects, each browser object being an object that is fetched automatically by the browser.

17. The SAS of claim 16, wherein the browser link to the compound object comprises at least a portion of a URL associated with one or more browser objects to be embedded into the compound object.

18. The SAS of claim 16, wherein the software code is JavaScript.

19. The SAS of claim 16, wherein the compound object is a multipart object.

20. A method, employed by an intermediate server residing between a plurality of user devices and a plurality of content servers, that accelerates the delivery of markup language ("ML") content to a requesting device, comprising:

receiving from a content server a response to a request from a user device for ML content;

parsing the received response for one or more browser links, wherein each browser link points to a unique browser object;

modifying the one or more browser links;

embedding in the parsed response:

a browser link that identifies a compound browser object located at the intermediate device; and an executable function;

creating the compound browser object by retrieving the unique browser objects associated with the one or more browser links, wherein the unique browser objects retrieved have not been previously obtained by the requesting user device; and creating the executable function, wherein the executable function, when executed by the requesting user device, will operate to transmit the compound browser object to the requesting user device;

wherein a browser object is an object that is fetched automatically by the browser.

* * * * *